(12) United States Patent
Fu et al.

(10) Patent No.: US 12,045,639 B1
(45) Date of Patent: Jul. 23, 2024

(54) SYSTEM PROVIDING VISUAL ASSISTANTS WITH ARTIFICIAL INTELLIGENCE

(71) Applicant: BitHuman Inc

(72) Inventors: Yun Fu, Newton, MA (US); Steve Gu, Lafayette, CA (US)

(73) Assignee: BitHuman Inc, Milpitas, CA (US)

( * ) Notice: Subject to any disclaimer, the term of this patent is extended or adjusted under 35 U.S.C. 154(b) by 0 days.

(21) Appl. No.: 18/237,194

(22) Filed: Aug. 23, 2023

(51) Int. Cl.
*G06F 9/451* (2018.01)
*G06T 13/20* (2011.01)
*G06T 13/40* (2011.01)
*G10L 17/22* (2013.01)

(52) U.S. Cl.
CPC ............ *G06F 9/453* (2018.02); *G06T 13/205* (2013.01); *G06T 13/40* (2013.01); *G10L 17/22* (2013.01)

(58) Field of Classification Search
CPC ....... G06F 9/453; G06T 13/205; G06T 13/40; G10L 17/22
See application file for complete search history.

(56) References Cited

U.S. PATENT DOCUMENTS

| | | | | |
|---|---|---|---|---|
| 7,133,535 B2 * | 11/2006 | Huang | ................ | G06V 40/20 704/E21.02 |
| 10,755,463 B1 * | 8/2020 | Albuz | ................ | G10L 13/00 |
| 10,931,976 B1 * | 2/2021 | Joze | ................ | G11B 27/036 |
| 11,010,129 B1 * | 5/2021 | Rakshit | ................ | G06F 9/453 |
| 11,120,597 B2 * | 9/2021 | Cao | ................ | H04L 51/10 |
| 11,468,616 B1 * | 10/2022 | Steptoe | ................ | G06V 40/16 |
| 11,650,834 B1 * | 5/2023 | Varada | ................ | G06F 9/453 717/104 |
| 11,659,248 B1 * | 5/2023 | Yoo | ................ | H04N 21/8541 725/37 |
| 11,862,303 B1 * | 1/2024 | Gershoni | ................ | G06N 3/006 |
| 11,875,240 B1 * | 1/2024 | Bosnjakovic | ....... | G06F 16/3329 |
| 11,948,241 B2 * | 4/2024 | Shin | ................ | G10L 15/16 |
| 2003/0078784 A1 * | 4/2003 | Jordan | ................ | H04N 21/4316 704/E15.04 |
| 2008/0235320 A1 * | 9/2008 | Joy | ................ | G06T 19/00 709/201 |
| 2011/0225039 A1 * | 9/2011 | Goldman | ................ | G06Q 30/02 715/757 |
| 2011/0225514 A1 * | 9/2011 | Goldman | ................ | G06T 19/00 715/757 |
| 2014/0114886 A1 * | 4/2014 | Mays | ................ | G06F 16/2423 706/12 |
| 2014/0132634 A1 * | 5/2014 | Wang | ................ | G06F 16/5866 345/634 |
| 2014/0317502 A1 * | 10/2014 | Brown | ................ | G06Q 10/02 715/706 |
| 2015/0186156 A1 * | 7/2015 | Brown | ................ | H04L 51/02 715/706 |
| 2017/0060371 A1 * | 3/2017 | Bonura | ................ | G06F 3/0484 |
| 2017/0206095 A1 * | 7/2017 | Gibbs | ................ | G06F 3/167 |
| 2017/0345201 A1 * | 11/2017 | Lin | ................ | G10L 13/086 |
| 2018/0046886 A1 * | 2/2018 | Greenberger | .......... | G06Q 50/01 |
| 2018/0232566 A1 * | 8/2018 | Griffin | ................ | G06V 40/166 |
| 2019/0043030 A1 * | 2/2019 | Wang | ................ | G06Q 20/12 |
| 2019/0147665 A1 * | 5/2019 | Banavara | ................ | G06V 20/20 345/419 |

(Continued)

*Primary Examiner* — Daniel Rodriguez

(57) ABSTRACT

Embodiments of the present disclosure may include a system providing visual assistants with artificial intelligence, including an artificial intelligence large language model engine (LLM)coupled to a computer system.

4 Claims, 5 Drawing Sheets

(56) References Cited

U.S. PATENT DOCUMENTS

| | | | | |
|---|---|---|---|---|
| 2019/0215449 A1* | 7/2019 | Chun | ........... | H04N 23/62 |
| 2019/0272413 A1* | 9/2019 | Eder | ........... | G06V 40/172 |
| 2019/0332400 A1* | 10/2019 | Spoor | ........... | G06F 3/013 |
| 2020/0265842 A1* | 8/2020 | Singh | ........... | G10L 17/00 |
| 2020/0320995 A1* | 10/2020 | Min | ........... | G06F 21/32 |
| 2021/0074068 A1* | 3/2021 | Spivack | ........... | G06N 20/00 |
| 2021/0099761 A1* | 4/2021 | Zhang | ........... | H04N 21/233 |
| 2021/0248801 A1* | 8/2021 | Li | ........... | G06T 13/205 |
| 2021/0383586 A1* | 12/2021 | Bao | ........... | G06T 13/205 |
| 2022/0172710 A1* | 6/2022 | Brady | ........... | G06N 3/08 |
| 2022/0180867 A1* | 6/2022 | Bobbili | ........... | G10L 15/22 |
| 2022/0217307 A1* | 7/2022 | Bakke | ........... | E06B 7/30 |
| 2022/0301250 A1* | 9/2022 | Ko | ........... | G06V 40/174 |
| 2022/0301251 A1* | 9/2022 | Ko | ........... | G10L 17/22 |
| 2022/0310083 A1* | 9/2022 | Mohanty | ........... | G06N 5/02 |
| 2022/0398794 A1* | 12/2022 | Lee | ........... | G10L 15/26 |
| 2023/0013828 A1* | 1/2023 | Rakshit | ........... | H04L 65/1069 |
| 2023/0130287 A1* | 4/2023 | Zhao | ........... | G10L 21/10 |
| | | | | 345/474 |
| 2023/0178081 A1* | 6/2023 | Kawatake | ........... | G06T 11/60 |
| | | | | 704/235 |
| 2023/0230303 A1* | 7/2023 | Yang | ........... | G06T 13/205 |
| | | | | 345/419 |
| 2023/0343324 A1* | 10/2023 | Baeuml | ........... | G10L 15/22 |
| 2024/0031310 A1* | 1/2024 | Kumar | ........... | H04L 51/02 |

* cited by examiner

SYSTEM PROVIDING VISUAL ASSISTANTS WITH ARTIFICIAL INTELLIGENCE

BACKGROUND OF THE INVENTION

Embodiments of a system for providing visual assistants with artificial intelligence

BRIEF SUMMARY

Embodiments of the present disclosure may include a system providing visual assistants with artificial intelligence, including an artificial intelligence large language model engine (LLM)coupled to a computer system. In some embodiments, the computing system in electronic communication with the data store and is configured to execute computer-readable instructions.

Embodiments may also include an application that may be coupled to the computer system and the artificial intelligence large language model engine. In some embodiments, the application may be configured to listen to speech from a set of users. In some embodiments, the application may be configured to identify any of the set of users via speech or face or gesture recognition or any combinations and overlay of speech, face and gesture recognition.

In some embodiments, the application may be configured to detect speech or face or gesture or any combinations and overlay of speech, face and gesture. In some embodiments, the application may be configured to generate a set of visual assistants with artificial intelligence. In some embodiments, the application may be configured to generate a set of space with various environments that the set of visual assistants may be configured to operate within.

In some embodiments, the artificial intelligence LLM may be configured to process speech data labeling for the speech from the set of users. In some embodiments, the artificial intelligence LLM may be configured to generate and change voice profile, appearance profiles of the set of visual assistants. In some embodiments, the appearance profiles includes profiles of mouth, face, head and focus.

Embodiments may also include a memory system coupled to the computer system stores three-dimensional (3D)or two-dimensional (2D)model data for virtual characters and voice profile model data for the set of visual assistants. In some embodiments, the 3D or 2D model data may include a human-based model. In some embodiments, the human-based model may include 3D or 2D data defining face and body of a generic human figure.

In some embodiments, the human-based model may include gesture data. In some embodiments, voice profile model data may include voice profile data defining voice characters of the generic human figure. In some embodiments, the 2D model data may be gathered from 2D image of human photos that may include face or the whole body. In some embodiments, the digital memorial system may be configured to generate a set of sequences of 2D images or videos with same person in the human photos but with many different poses, views, gestures, facial expressions, and lip movements that may be configured to reflect 3D effects.

Embodiments of the present disclosure may also include a system providing visual assistants with artificial intelligence, including a cloud service. In some embodiments, the cloud service may include a rendering/streaming service, multiple visual machines, a speech-to-face engine, and a backend microservice system, and Kubernetes cluster.

In some embodiments, the backend microservice system may include a common large language model (LLM)engine, interactive APIs, an ID/tracking engine, management APIs, turned LLM engine, a core logic unit, a common local speech-to-text and text-to-speech engine, a set of databases, a metahuman dispatcher. In some embodiments, the metahuman dispatcher may be configured to provide inputs for the speech-to-face engine.

In some embodiments, the speech-to-face engine may be configured to provide inputs for the rendering/streaming service. Embodiments may also include an application that may be coupled to the cloud service. In some embodiments, the application may include a local large language model engine, a local 3D model, a local speech-to-text and text-to-speech engine, an front-end interface.

In some embodiments, the front-end interface may be configured to be a website. In some embodiments, the front-end interface may include an interactive overlay engine, an audio/video capturing engine, and a video steam engine with audio. In some embodiments, the application may be configured to listen to speech from a set of users.

In some embodiments, the application may be configured to identify any of the set of users via speech or face or gesture recognition or any combinations and overlay of speech, face and gesture recognition. In some embodiments, the application may be configured to detect speech or face or gesture or any combinations and overlay of speech, face and gesture.

In some embodiments, the application may be configured to generate a set of visual assistants with artificial intelligence. In some embodiments, the application may be configured to generate a set of spaces with various environments that the set of visual assistants may be configured to operate within. In some embodiments, the artificial intelligence LLM may be configured to process speech data labeling for the speech from the set of users.

In some embodiments, the artificial intelligence LLM may be configured to generate and change voice profiles, and appearance profiles of the set of visual assistants. In some embodiments, the appearance profiles include profiles of mouth, face, head and focus. In some embodiments, the interactive overlay engine may be communicating with the interactive APIs in the cloud service.

In some embodiments, the audio/video capturing engine may be communicating with the ID/tracking engine in the cloud service. In some embodiments, the visual stream engine with audio may be communicating with rendering/streaming service. Embodiments may also include a management website coupled to the cloud service. In some embodiments, the management website may be configured to control activities in the cloud service via the interface between the management website and the management APIs in the cloud service.

Embodiments of the present disclosure may also include a system providing visual assistants with artificial intelligence, including a cloud service. In some embodiments, the cloud service may include a rendering/streaming service, multiple visual machines, a speech-to-face engine, and a backend microservice system, and Kubernetes cluster.

In some embodiments, the backend microservice system may include a common large language model (LLM)engine, interactive APIs, an ID/tracking engine, management APIs, turned LLM engine, a core logic unit, a common local speech-to-text and text-to-speech engine, a set of databases, a metahuman dispatcher. In some embodiments, the metahuman dispatcher may be configured to provide inputs for the speech-to-face engine.

In some embodiments, the speech-to-face engine may be configured to provide inputs for the rendering/streaming service. Embodiments may also include an application that may be coupled to the cloud service. In some embodiments, the application may include a local large language model engine, a local 3D model, a local speech-to-text and text-to-speech engine, a front-end interface.

In some embodiments, the front end interface may be configured to be a website. In some embodiments, the front end interface may include an interactive overlay engine, an audio/video capturing engine, and a video steam engine with audio. In some embodiments, the application may be configured to listen to speech from a set of users.

In some embodiments, the application may be configured to identify any of the set of users via speech or face or gesture recognition or any combinations and overlay of speech, face and gesture recognition. In some embodiments, the application may be configured to detect speech or face or gesture or any combinations and overlay of speech, face and gesture.

In some embodiments, the application may be configured to generate a set of visual assistants with artificial intelligence. In some embodiments, the application may be configured to generate a set of space with various environments that the set of visual assistants may be configured to operate within. In some embodiments, the artificial intelligence LLM may be configured to process speech data labeling for the speech from the set of users.

In some embodiments, the artificial intelligence LLM may be configured to generate and change voice profile, appearance profiles of the set of visual assistants. In some embodiments, the appearance profiles includes profiles of mouth, face, head and focus. In some embodiments, the interactive overlay engine may be communicating with the interactive APIs in the cloud service.

In some embodiments, the audio/video capturing engine may be communicating with the ID/tracking engine in the cloud service. In some embodiments, the visual stream engine with audio may be communicating with rendering/streaming service. Embodiments may also include a management application coupled to the cloud service. In some embodiments, the management application may be configured to control activities in the cloud service via the interface between the management application and the management APIs in the cloud service. In some embodiments, the management application may be configured to be able to run at different platforms.

DETAILED DESCRIPTION

Figure 1:
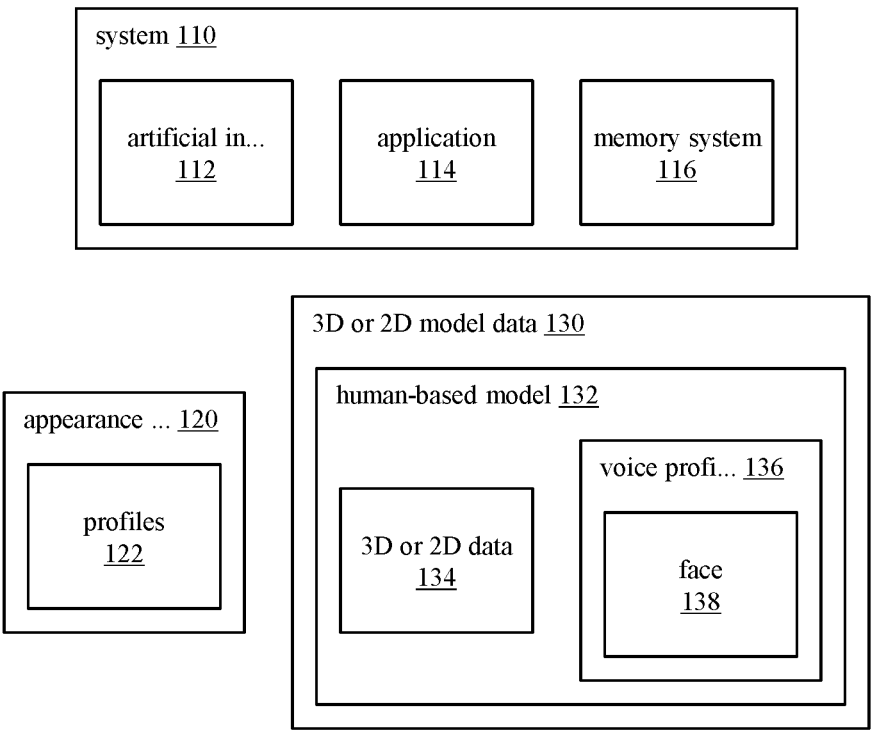
FIG. 1 is a block diagram illustrating a system, according to some embodiments of the present disclosure.

FIG. 1 is a block diagram that describes a system 110, according to some embodiments of the present disclosure. In some embodiments, the system 110 may include an artificial intelligence large language model engine 112 (LLM) coupled to a computer system, an application 114 that may be coupled to the computer system and the artificial intelligence large language model engine 112, and a memory system 116 coupled to the computer system stores three-dimensional (3D)or two-dimensional (2D)model data for virtual characters and voice profile model data for the set of visual assistants.

In some embodiments, the computing system in electronic communication with the data store and configured to execute computer-readable instructions. The application 114 may be configured to listen to speech from a set of users. The application 114 may be configured to identify any of the set of users via speech or face or gesture recognition or any combinations and overlay of speech, face and gesture recognition. The application 114 may be configured to detect speech or face or gesture or any combinations and overlay of speech, face and gesture.

In some embodiments, the application 114 may be configured to generate a set of visual assistants with artificial intelligence. The application 114 may be configured to generate a set of space with various environments that the set of visual assistants may be configured to operate within. The artificial intelligence LLM may be configured to process speech data labeling for the speech from the set of users. The artificial intelligence LLM may be configured to generate and change voice profile, appearance profiles 120 of the set of visual assistants.

In some embodiments, the appearance profiles 120 may also include profiles 122 of mouth, face, head and focus. The 3D or 2D model data 130 may include a human-based model 132. The human-based model 132 may include 3D or 2D data 134 defining face and body of a generic human figure and voice profile data 136 defining voice characters of the generic human figure. Gesture data. Voice profile model data. The voice profile data 136 may include face 138 or the whole body. The 2D model data 130 may be gathered from 2D image of human photos that may. The digital memorial system may be configured to generate a set of sequences of 2D images or videos with same person in the human photos but with many different poses, views, gestures, facial expressions, and lip movements that may be configured to reflect 3D effects.

Figure 2:
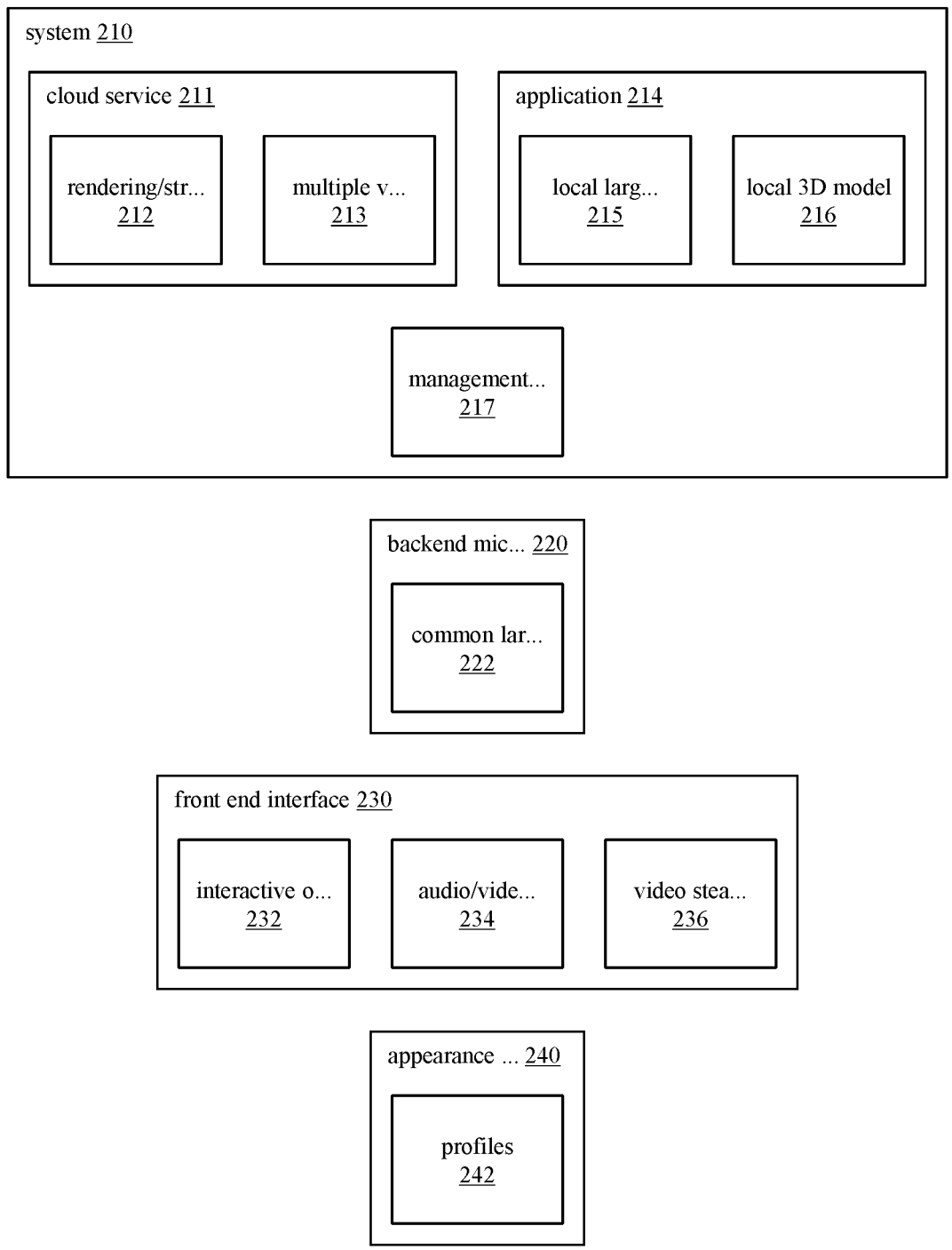
FIG. 2 is a block diagram illustrating a system, according to some embodiments of the present disclosure.

FIG. 2 is a block diagram that describes a system 210, according to some embodiments of the present disclosure. In some embodiments, the system 210 may include a cloud service 211, an application 214 that may be coupled to the cloud service 211, and a management website 217 coupled to the cloud service 211. The cloud service 211 may include a rendering/streaming service 212. The cloud service 211 may also include multiple visual machines 213, a speech-to-face engine, and a backend microservice system 220, and Kubernetes cluster.

In some embodiments, the application 214 may include a local large language model engine 215. The application 214 may also include a local 3D model 216, a local speech-to-text and text-to-speech engine, an front end interface 230. The front end interface 230 may be configured to be a website. The management website 217 may be configured to control activities in the cloud service 211 via the interface 230 between the management website 217 and the management APIs in the cloud service 211.

In some embodiments, the backend microservice system 220 may also include a common large language model 222 (LLM)engine, interactive APIs, an ID/tracking engine, management APIs, turned LLM engine, a core logic unit, a common local speech-to-text and text-to-speech engine, a set of databases, a metahuman dispatcher. The metahuman dispatcher may be configured to provide inputs for the speech-to-face engine. The speech-to-face engine may be configured to provide inputs for the rendering/streaming service 212.

In some embodiments, the front end interface 230 may include an interactive overlay engine 232, an audio/video capturing engine 234, and a video steam engine 236 with audio. The application 214 may be configured to listen to speech from a set of users. The application 214 may be configured to identify any of the set of users via speech or face or gesture recognition or any combinations and overlay of speech, face and gesture recognition.

In some embodiments, the application 214 may be configured to detect speech or face or gesture or any combinations and overlay of speech, face and gesture. The application 214 may be configured to generate a set of visual assistants with artificial intelligence. The application 214 may be configured to generate a set of space with various environments that the set of visual assistants may be configured to operate within.

In some embodiments, the artificial intelligence LLM may be configured to process speech data labeling for the speech from the set of users. The artificial intelligence LLM may be configured to generate and change voice profile, appearance profiles 240 of the set of visual assistants. The appearance profiles 240 may also include profiles 242 of mouth, face, head and focus. The interactive overlay engine 232 may be communicating with the interactive APIs in the cloud service 211. The audio/video capturing engine 234 may be communicating with the ID/tracking engine in the cloud service 211. The visual stream engine with audio may be communicating with rendering/streaming service.

Figure 3:
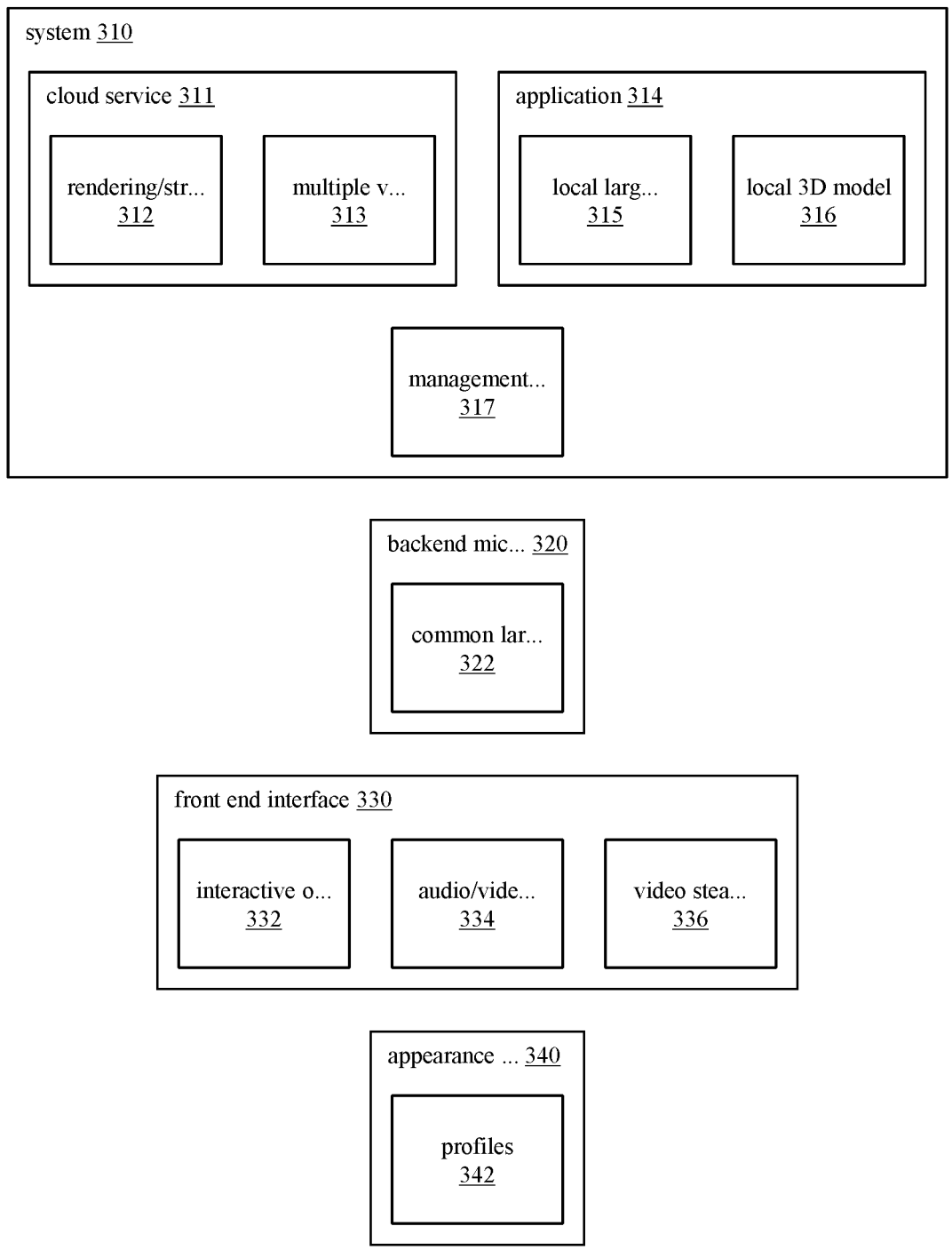
FIG. 3 is a block diagram illustrating a system, according to some embodiments of the present disclosure.

FIG. 3 is a block diagram that describes a system 310, according to some embodiments of the present disclosure. In some embodiments, the system 310 may include a cloud service 311, an application 314 that may be coupled to the cloud service 311, and a management application 317 coupled to the cloud service 311. The cloud service 311 may include a rendering/streaming service 312. The cloud service 311 may also include multiple visual machines 313, a speech-to-face engine, and a backend microservice system 320, and Kubernetes cluster.

In some embodiments, the application 314 may include a local large language model engine 315. The application 314 may also include a local 3D model 316, a local speech-to-text and text-to-speech engine, an front end interface 330. The front end interface 330 may be configured to be a website. The management application 317 may be configured to control activities in the cloud service 311 via the interface 330 between the management application 317 and the management APIs in the cloud service 311.

In some embodiments, the management application 317 may be configured to be able to run on different platforms. The backend microservice system 320 may also include a common large language model 322 (LLM)engine, interactive APIs, an ID/tracking engine, management APIs, turned LLM engine, a core logic unit, a common local speech-to-text and text-to-speech engine, a set of databases, a metahuman dispatcher. The metahuman dispatcher may be configured to provide inputs for the speech-to-face engine.

In some embodiments, the speech-to-face engine may be configured to provide inputs for the rendering/streaming service 312. The front end interface 330 may include an interactive overlay engine 332, an audio/video capturing engine 334, and a video steam engine 336 with audio. The application 314 may be configured to listen to speech from a set of users. The application 314 may be configured to identify any of the set of users via speech or face or gesture recognition or any combinations and overlay of speech, face and gesture recognition.

In some embodiments, the application 314 may be configured to detect speech or face or gesture or any combinations and overlay of speech, face and gesture. The application 314 may be configured to generate a set of visual assistants with artificial intelligence. The application 314 may be configured to generate a set of space with various environments that the set of visual assistants may be configured to operate within.

In some embodiments, the artificial intelligence LLM may be configured to process speech data labeling for the speech from the set of users. The artificial intelligence LLM may be configured to generate and change voice profile, and appearance profiles 340 of the set of visual assistants. The appearance profile 340 may also include profiles 342 of mouth, face, head and focus. The interactive overlay engine 332 may be communicating with the interactive APIs in the cloud service 311. The audio/video capturing engine 334 may be communicating with the ID/tracking engine in the cloud service 311. The visual stream engine with audio may be communicating with the rendering/streaming service.

Figure 4A:
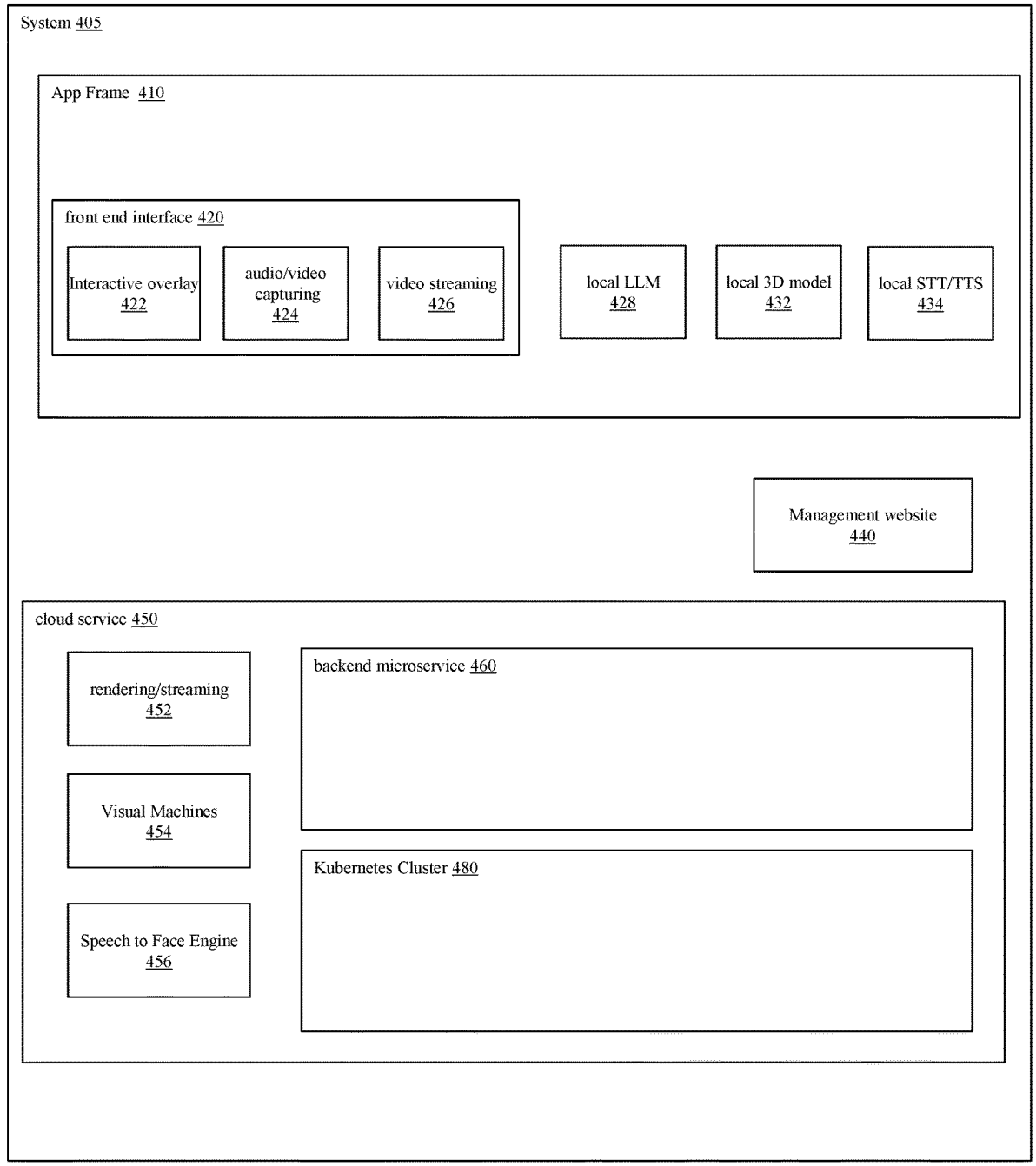
FIG. 4A is a block diagram illustrating a system, according to some embodiments of the present disclosure.

FIG. 4A is a block diagram illustrating system 405, according to some embodiments of the present disclosure. System 405 includes an App Frame 410 that comprises a front-end application 420. The front-end application 420 may include an interactive overlay 422, audio/video capturing 424, video streaming 426. The App Frame 410 also includes local LLM 428, local 3D model 432, and local STT/TTS 434. In some embodiments, the App Frame 410 may include a local large language model engine 428. The application 410 may also include a local 3D model 432, a local speech-to-text and text-to-speech engine 434, a front-end interface 420. The front-end interface 420 may be configured to be a website. The application 420 may be configured to identify any of the set of users via speech or face or gesture recognition or any combinations and overlay of speech, face and gesture recognition. In some embodiments, the artificial intelligence LLM may be configured to process speech data labeling for the speech from the set of users. The artificial intelligence LLM may be configured to generate and change voice profiles, and appearance profiles of the set of visual assistants. The appearance profile may also include profiles of the mouth, face, head and focus. The interactive overlay engine may be communicating with the interactive APIs in a cloud service. The audio/video capturing engine may be communicating with the ID/tracking engine in the cloud service. The visual stream engine with audio may be communicating with the rendering/streaming service.

In some embodiments, System 405 comprises a cloud service 450. In some embodiments, the cloud service 450 may include a rendering/streaming service 452. The cloud service 450 may also include multiple visual machines 454, a speech-to-face engine 456, and a backend microservice system 460, and Kubernetes cluster 480.

In some embodiments, System 405 comprises a management website 440. The management website 440 may be configured to control activities in the cloud service 450 via the interface between the management application 440 and the management APIs in the cloud service 450.

Figure 4B:
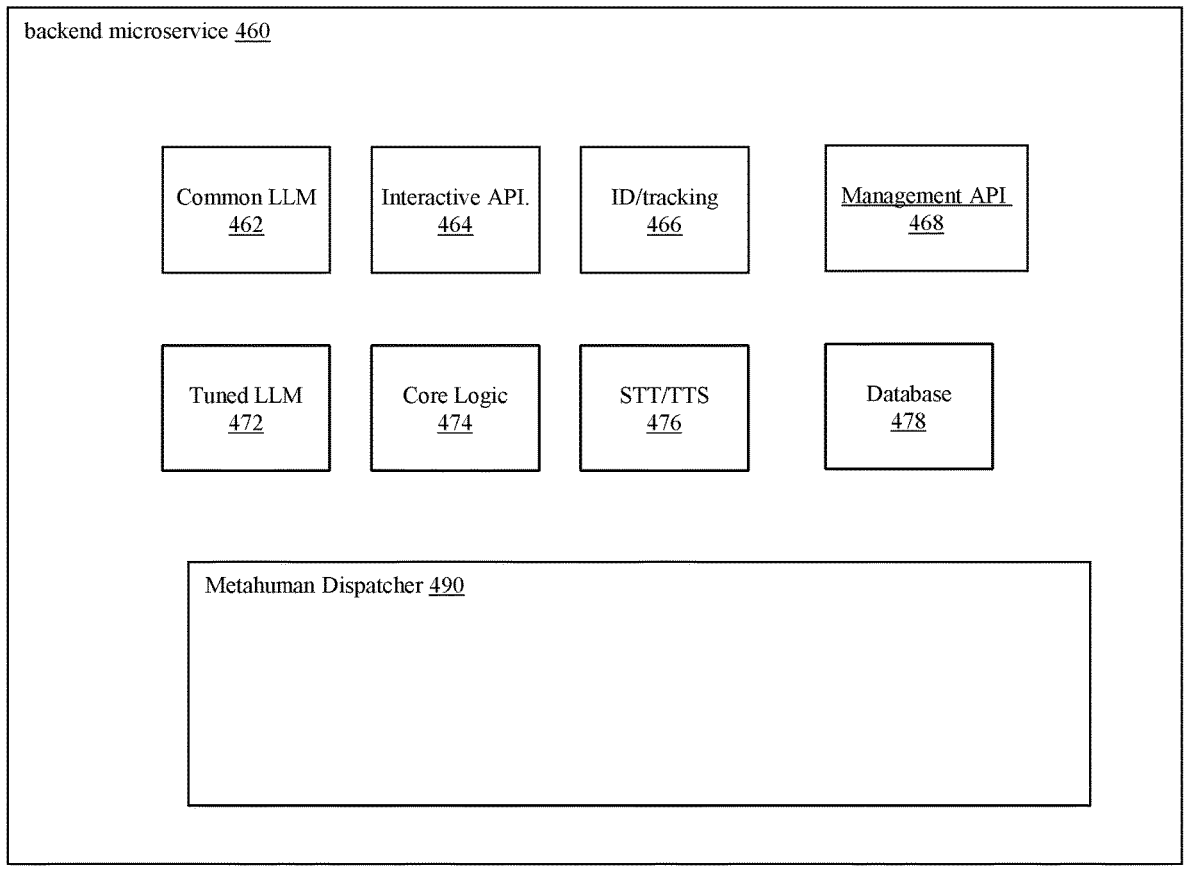
FIG. 4B is a block diagram illustrating an example of backend part of the system in FIG. 4A, according to some embodiments of the present disclosure.

FIG. 4B is a block diagram illustrating an example of backend part of the system in FIG. 4A, according to some embodiments of the present disclosure. The backend part of the system is Microservice 460. In some embodiment, microservice 460 include Common LLM 462, Interactive API 464, ID/tracking engine 466, Management API 468, Tuned LLM 472, Core Logic 474, STT/TTS 476, Database 478. In some embodiments, the Microservice 460 includes Metahuman Dispatcher 490. In some embodiments, The management website 440 may be configured to control activities in the cloud service 450 via the interface between the management application 440 and the management APIs 468 in the cloud service 450.

The invention claimed is:

1. A system providing visual assistants with artificial intelligence, comprising:
    an artificial intelligence large language model engine (LLM) coupled to a computer system, the computing system in electronic communication with a data store and is configured to execute computer-readable instructions;
    an application that is coupled to the computer system and the artificial intelligence large language model engine, wherein the application is configured to listen to speech from a set of users, wherein the application is configured to identify any of the set of users via speech or face or gesture recognition or any combinations of speech, face and gesture recognition, wherein the application is configured to detect speech or face or gesture or any combinations of speech, face and gesture, wherein the application is configured to generate a set of visual assistants with artificial intelligence, wherein the application is configured to generate a set of spaces with various environments that the set of visual assistants is configured to operate within, wherein the artificial intelligence LLM is configured to process speech data labeling for the speech from the set of users, wherein the artificial intelligence LLM is configured to generate and change voice profiles, appearance profiles of the set of visual assistants, wherein the appearance profiles includes profiles of mouth, face, head and focus; and
    a memory system coupled to the computer system stores three-dimensional (3D) or two-dimensional (2D) model data for virtual characters and voice profile model data for the set of visual assistants, wherein the 3D or 2D model data comprises a human-based model, wherein the human-based model comprises 3D or 2D data defining face and body of a generic human figure, wherein the human-based model comprises gesture data, wherein voice profile model data comprises voice profile data defining voice characters of the generic human figure, wherein the 2D model data is gathered from 2D image of human photos that may comprise face or the whole body, wherein a digital memorial system is configured to generate a set of sequences of 2D images or videos with same person in the human photos but with many different poses, views, gestures, facial expressions, and lip movements that are configured to reflect 3D effects.

2. A system providing visual assistants with artificial intelligence, comprising:
    a processor;
    a cloud service coupled to the processor, wherein the cloud service comprises a rendering/streaming service, multiple visual machines, a speech-to-face engine, and a backend microservice system, and Kubernetes cluster, wherein the backend microservice system comprises a common large language model (LLM) engine, interactive APIs, an ID/tracking engine, management APIs, turned LLM engine, a core logic unit, a common local speech-to-text and text-to-speech engine, a set of databases, a metahuman dispatcher, wherein the metahuman dispatcher is configured to provide inputs for the speech-to-face engine, wherein the speech-to-face engine is configured to provide inputs for the rendering/streaming service;
    an application that is coupled to the cloud service, wherein the application comprises a local large language model engine, a local 3D model, a local speech-to-text and text-to-speech engine, an front end interface, wherein the front end interface is configured to be a website, wherein the front end interface comprises an interactive overlay engine, an audio/video capturing engine, and a video stream engine with audio, wherein the application is configured to listen to speech from a set of users, wherein the application is configured to identify any of the set of users via speech or face or gesture recognition or any combinations of speech, face and gesture recognition, wherein the application is configured to detect speech or face or gesture or any combinations of speech, face and gesture, wherein the application is configured to generate a set of visual assistants with artificial intelligence, wherein the application is configured to generate a set of space with various environments that the set of visual assistants is configured to operate within, wherein the artificial intelligence LLM is configured to process speech data labeling for the speech from the set of users, wherein the artificial intelligence LLM is configured to generate and change voice profile, appearance profiles of the set of visual assistants, wherein the appearance profiles includes profiles of mouth, face, head and focus, wherein the interactive overlay engine is communicating with the interactive APIs in the cloud service, wherein the audio/video capturing engine is communicating with the ID/tracking engine in the cloud service, wherein the visual stream engine with audio is communicating with rendering/streaming service;
    a management website coupled to the cloud service, wherein the management website is configured to control activities in the cloud service via the interface between the management website and the management APIs in the cloud service; and
    a memory system coupled to the processor, wherein the memory system is configured to store three-dimensional (3D) or two-dimensional (2D) model data for virtual characters and voice profile model data for the set of visual assistants, wherein the 3D or 2D model data comprises a human-based model, wherein the human-based model comprises 3D or 2D data defining face and body of a generic human figure, wherein the human-based model comprises gesture data, wherein voice profile model data comprises voice profile data defining voice characters of the generic human figure, wherein the 2D model data is gathered from 2D image of human photos that may comprise face or the whole body, wherein a digital memorial system is configured to generate a set of sequences of 2D images or videos with the same person in the human photos but with many different poses, views, gestures, facial expressions, and lip movements that are configured to reflect 3D effects.

3. A system providing visual assistants with artificial intelligence, comprising:
    a processor;
    a cloud service coupled to the processor, wherein the cloud service comprises a rendering/streaming service, multiple visual machines, a speech-to-face engine, and a backend microservice system, and Kubernetes cluster, wherein the backend microservice system comprises a common large language model (LLM) engine, interactive APIs, an ID/tracking engine, management APIs, turned LLM engine, a core logic unit, a common local speech-to-text and text-to-speech engine, a set of databases, a metahuman dispatcher, wherein the metahuman dispatcher is configured to provide inputs for the speech-to-face engine, wherein the speech-to-face engine is configured to provide inputs for the rendering/streaming service;

an application that is coupled to the cloud service, wherein the application comprises a local large language model engine, a local 3D model, a local speech-to-text and text-to-speech engine, an front end interface, wherein the front end interface is configured to be a website, wherein the front end interface comprises an interactive overlay engine, an audio/video capturing engine, and a video stream engine with audio, wherein the application is configured to listen to speech from a set of users, wherein the application is configured to identify any of the set of users via speech or face or gesture recognition or any combinations of speech, face and gesture recognition, wherein the application is configured to detect speech or face or gesture or any combinations of speech, face and gesture, wherein the application is configured to generate a set of visual assistants with artificial intelligence, wherein the application is configured to generate a set of space with various environments that the set of visual assistants is configured to operate within, wherein the artificial intelligence LLM is configured to process speech data labeling for the speech from the set of users, wherein the artificial intelligence LLM is configured to generate and change voice profile, appearance profiles of the set of visual assistants, wherein the appearance profiles includes profiles of mouth, face, head and focus, wherein the interactive overlay engine is communicating with the interactive APIs in the cloud service, wherein the audio/video capturing engine is communicating with the ID/tracking engine in the cloud service, wherein the visual stream engine with audio is communicating with rendering/streaming service;

a management application coupled to the cloud service, wherein the management application is configured to control activities in the cloud service via the interface between the management application and the management APIs in the cloud service, wherein the management application is configured to be able to run at different platforms;

a memory system coupled to the processor, wherein the memory system is configured to store three-dimensional (3D) or two-dimensional (2D) model data for virtual characters and voice profile model data for the set of visual assistants, wherein the 3D or 2D model data comprises a human-based model, wherein the human-based model comprises 3D or 2D data defining face and body of a generic human figure, wherein the human-based model comprises gesture data, wherein voice profile model data comprises voice profile data defining voice characters of the generic human figure, wherein the 2D model data is gathered from 2D image of human photos that may comprise face or the whole body, wherein a digital memorial system is configured to generate a set of sequences of 2D images or videos with same person in the human photos but with many different poses, views, gestures, facial expressions, and lip movements that are configured to reflect 3D effects.

4. The system providing visual assistants with artificial intelligence of claim 3, wherein the different platforms include Window-based computer, IOS-based smartphones, Android-based smartphones, and cloud-based devices, wherein the cloud-based devices are configured to have no local storage.

* * * * *